(12) United States Patent
McGuire et al.

(10) Patent No.: US 12,378,912 B2
(45) Date of Patent: Aug. 5, 2025

(54) ELECTRONICALLY CONTROLLED PRESSURE RELIEF SYSTEM FOR AN ENGINE

(71) Applicant: Raytheon Technologies Corporation, Farmington, CT (US)

(72) Inventors: Connor J. McGuire, West Hartford, CT (US); Francis Parnin, Suffield, CT (US)

(73) Assignee: RTX Corporation, Farmington, CT (US)

( * ) Notice: Subject to any disclaimer, the term of this patent is extended or adjusted under 35 U.S.C. 154(b) by 154 days.

(21) Appl. No.: 18/143,867

(22) Filed: May 5, 2023

(65) Prior Publication Data
US 2024/0369017 A1 Nov. 7, 2024

(51) Int. Cl.
*F02C 7/06* (2006.01)
*F16K 24/04* (2006.01)

(52) U.S. Cl.
CPC .............. *F02C 7/06* (2013.01); *F16K 24/04* (2013.01); *F05D 2260/605* (2013.01); *F05D 2260/98* (2013.01)

(58) Field of Classification Search
CPC .... F02C 7/06; F02C 7/14; F16K 24/04; F05D 2260/605; F05D 2260/98; F05D 2270/301; F05D 2270/3015; F05D 2220/32; F01D 25/08; F01D 25/12; F01D 25/18; F01D 25/20; F01M 1/16
See application file for complete search history.

(56) References Cited

U.S. PATENT DOCUMENTS

| | | | |
|---|---|---|---|
| 3,007,303 A * | 11/1961 | Williams | F02C 9/16 251/285 |
| 6,902,156 B2 | 6/2005 | Muramatsu | |
| 8,464,761 B2 | 6/2013 | Young | |
| 8,500,869 B1 * | 8/2013 | Johnson | F16N 19/00 96/219 |
| 11,118,698 B2 | 9/2021 | Alecu | |
| 11,525,399 B1 | 12/2022 | Smith | |
| 2008/0135110 A1 | 6/2008 | Vasquez | |
| 2014/0003906 A1 * | 1/2014 | Motto | F01D 25/18 415/122.1 |

(Continued)

FOREIGN PATENT DOCUMENTS

| FR | 3099941 B1 | 8/2022 |
|---|---|---|
| GB | 1167692 A | 10/1969 |

OTHER PUBLICATIONS

EP Search Report for EP Patent Application No. 24173946.5 dated Oct. 11, 2024.

(Continued)

*Primary Examiner* — Loren C Edwards
(74) *Attorney, Agent, or Firm* — Getz Balich LLC

(57) ABSTRACT

A fluid system is provided for an aircraft engine. This fluid system includes a lubricant reservoir and a pressure relief system. The lubricant reservoir includes an internal volume. The pressure relief system includes a sensor system, a pressure relieve valve and a controller. The sensor system is configured to provide sensor data indicative of an air pressure within the internal volume. The pressure relief valve is fluidly coupled with the internal volume. The controller is configured to control operation of the pressure relieve valve based on the sensor data.

19 Claims, 9 Drawing Sheets

(56) References Cited

U.S. PATENT DOCUMENTS

2016/0017747 A1   1/2016   Parnin
2016/0130972 A1*  5/2016   Kozuch .................. F02K 3/075
                                                   137/487.5
2021/0324798 A1  10/2021   Fujii
2022/0235708 A1   7/2022   Fert

OTHER PUBLICATIONS

Blaine Andersen, "The Analysis and Design of Pneumatic Systems", pp. 42-43, 2001.

* cited by examiner

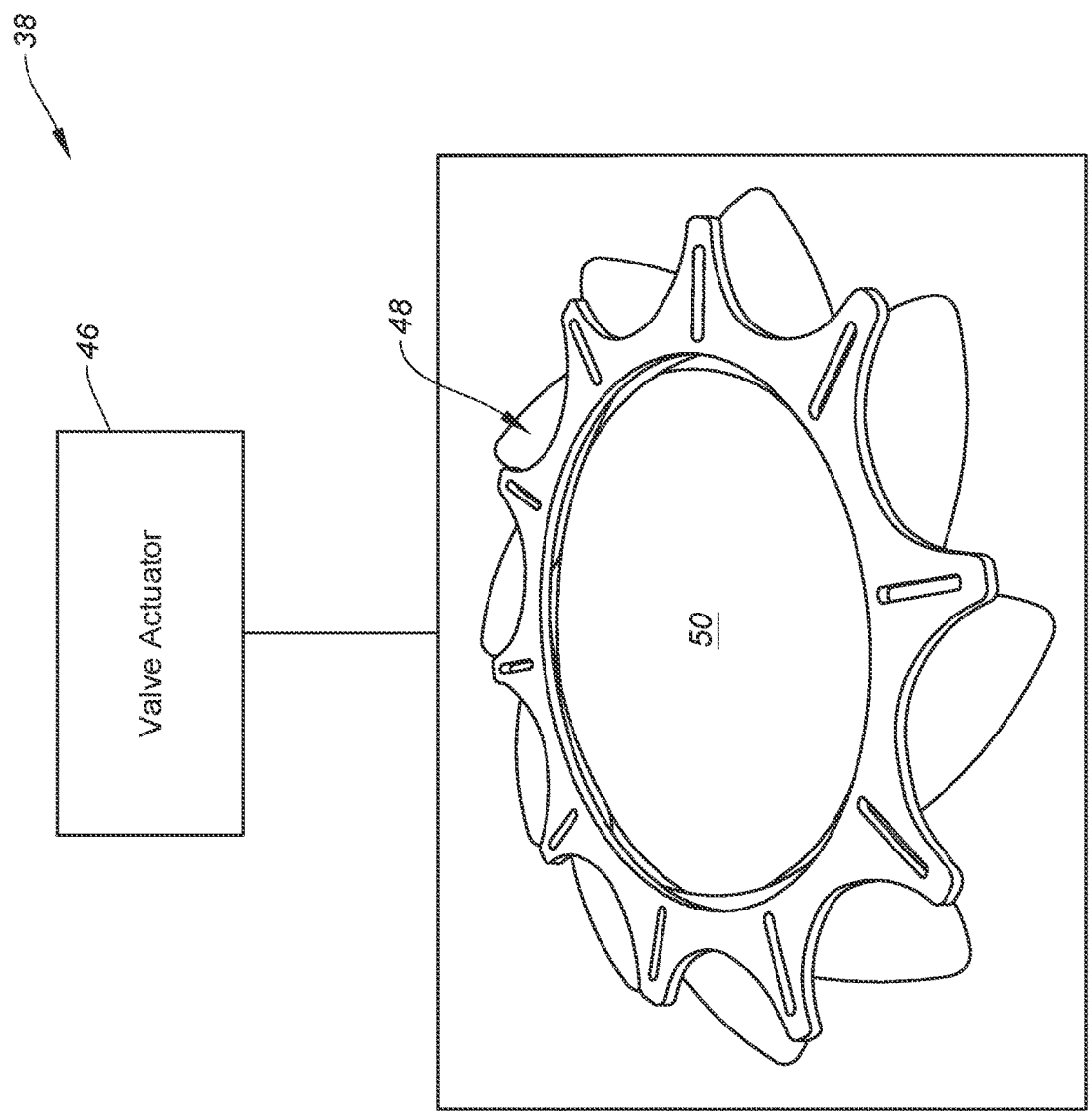

ELECTRONICALLY CONTROLLED PRESSURE RELIEF SYSTEM FOR AN ENGINE

BACKGROUND OF THE DISCLOSURE

1. Technical Field

This disclosure relates generally to a fluid system and, more particularly, to a pressure relief system for an internal volume of the fluid system.

2. Background Information

A fluid system may include a pressure relief valve to relieve pressure within, for example, an internal volume of a tank. Various types and configurations of pressure relief valves are known in the art. While these known pressure relief valves have various benefits, there is still room in the art for improvement. There is a need in the art, for example, for a pressure relief valve which can facilitate improved operation across various different operating conditions.

SUMMARY OF THE DISCLOSURE

According to an aspect of the present disclosure, a fluid system is provided for an aircraft engine. This fluid system includes a lubricant reservoir and a pressure relief system. The lubricant reservoir includes an internal volume. The pressure relief system includes a sensor system, a pressure relieve valve and a controller. The sensor system is configured to provide sensor data indicative of an air pressure within the internal volume. The pressure relief valve is fluidly coupled with the internal volume. The controller is configured to control operation of the pressure relieve valve based on the sensor data.

According to another aspect of the present disclosure, an apparatus is provided for an aircraft. This apparatus includes a gas turbine engine. The gas turbine engine includes a reservoir and a pressure relief system. The reservoir includes an internal volume. The pressure relief system includes a sensor system, a pressure relieve valve and a controller. The sensor system is configured to provide sensor data indicative of a gas pressure within the internal volume. The pressure relief valve is fluidly coupled with the internal volume. The controller is configured to control operation of the pressure relieve valve based on the sensor data.

According to still another aspect of the present disclosure, another fluid system is provided for an aircraft. This fluid system includes a fluid reservoir and a pressure relief system. The fluid reservoir includes an internal volume. The pressure relief system includes a sensor system, a pressure relieve valve and a controller. The sensor system is configured to provide sensor data indicative of a fluid pressure within the internal volume. The pressure relief valve includes a variable area opening fluidly coupled with the internal volume. The controller is configured to signal the pressure relief valve to selectively change a flow area of the variable area opening based on the sensor data to change how much gas is vented out of the internal volume through the variable area opening.

The fluid reservoir may be configured to contain engine lubricant within the internal volume.

The controller may be configured to signal the pressure relief valve to vent a gas out of the internal volume when the gas pressure within the internal volume rises above a threshold.

The reservoir may be configured to contain a liquid within the internal volume.

The pressure relief valve may be configured as or otherwise include a variable area valve.

The controller may be configured to signal the pressure relieve valve to vent a fluid comprising air out of the internal volume when the air pressure within the internal volume is greater than a threshold.

The controller may be configured to signal the pressure relief valve to close when the air pressure within the internal volume is less than a threshold.

The pressure relief valve may have a variable area opening. The controller may be configured to signal the pressure relief valve to change a flow area of the variable area opening from a first value to a second value based on the sensor data.

The controller may also be configured to control the operation of the pressure relieve valve based on an operational parameter of the aircraft engine.

The controller may also be configured to control the operation of the pressure relief valve based on an altitude of the aircraft engine.

The controller may also be configured to control the operation of the pressure relief valve based on an ambient parameter outside of the aircraft engine.

The pressure relief valve may be configured as or otherwise include an iris valve.

The pressure relief valve may be configured as or otherwise include a butterfly valve.

The pressure relief valve may be configured as or otherwise include a needle valve.

The pressure relieve valve may be configured to vent a fluid comprising air out of the internal volume into an environment external to the aircraft engine.

The fluid system may also include an engine component and a source circuit. The source circuit may be configured to direct a lubricant from the internal volume to the engine component.

The fluid system may also include a return circuit configured to direct the lubricant from the engine component into the internal volume.

The fluid system may also include a deaerator configured to separate air from the lubricant directed into the internal volume through the return circuit.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 3A-C are schematic illustrations of a pressure relief valve in various positions.

DETAILED DESCRIPTION

Figure 1:
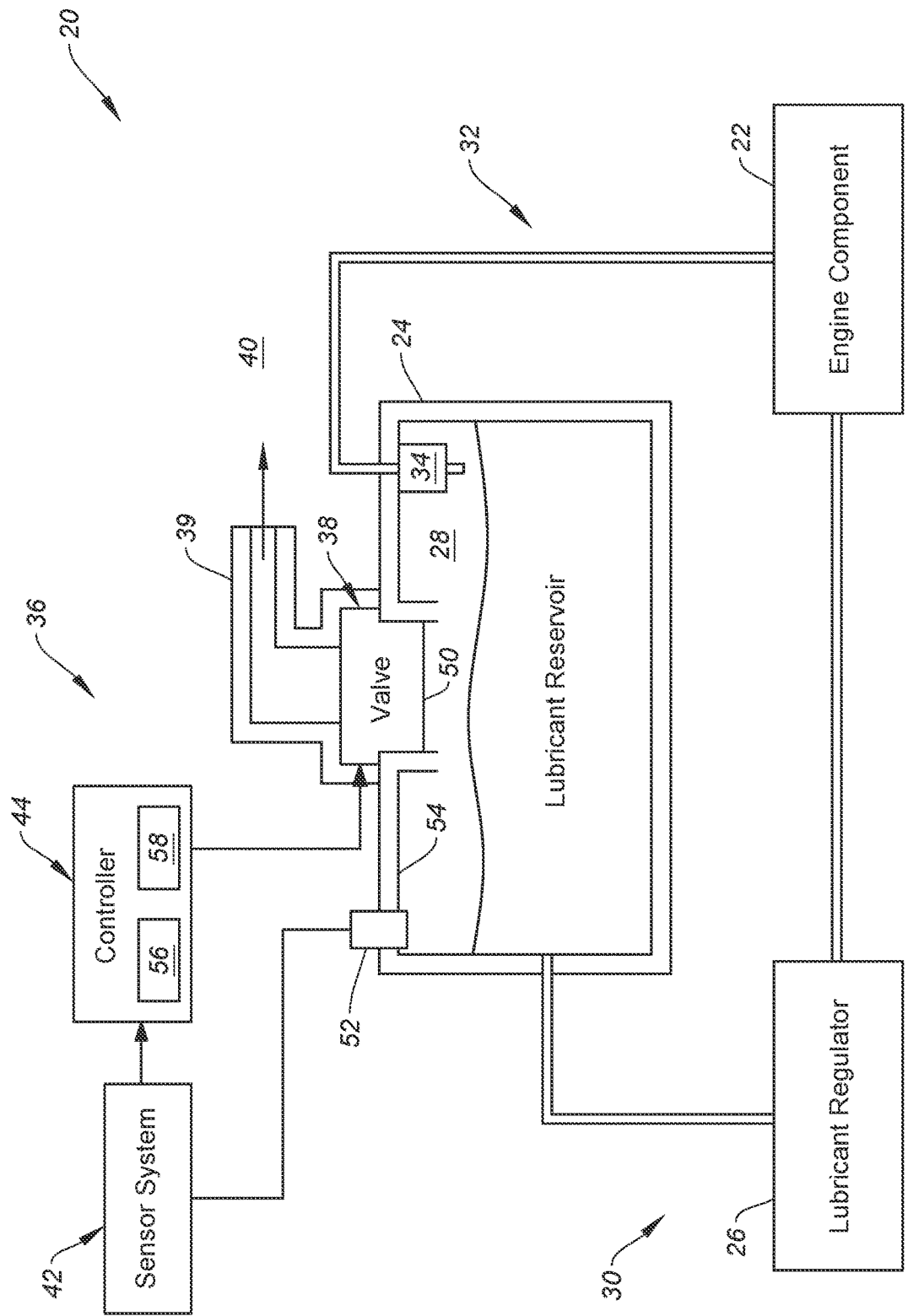
FIG. 1 is a schematic illustration of a fluid system for an engine.

FIG. 1 illustrates a fluid system 20 for a gas turbine engine. The gas turbine engine may be configured as part of a propulsion system for an aircraft. The gas turbine engine, for example, may be configured as a turbofan engine, a turbojet engine, a propfan engine, a pusher fan engine, a turboprop engine or a turboshaft engine. The gas turbine engine may also or alternatively be configured as part of an electrical power generation system for the aircraft. The gas turbine engine, for example, may be configured as an auxiliary power unit (APU) engine. The gas turbine engine of the present disclosure, however, is not limited to aircraft applications. The gas turbine engine, for example, may alternatively be configured for a ground-based electrical power generation system. Furthermore, the fluid system 20 of the present disclosure is not limited to gas turbine engine applications. The fluid system 20 of the present disclosure, for example, may be configured to provide working fluid to, receive the working fluid from and/or circulate the working fluid within/through any apparatus which can utilize the working fluid for apparatus operation. The fluid system 20, for example, may alternatively be configured for another type of internal combustion (IC) engine such as, but not limited to, a reciprocating piston engine or a rotary engine; e.g., a Wankel engine. However, for ease of description, the fluid system 20 may be described herein with respect to the gas turbine engine.

The fluid system 20 of FIG. 1 is configured to provide a working fluid to, receive the working fluid from and/or circulate the working fluid through at least one component 22 (or multiple components) of the gas turbine engine. Examples of the engine component include, but are not limited to, a bearing, a gear, a transmission, a gearbox, a seal element and a heat exchanger. For ease of description, the fluid system 20 and its working fluid may be described below with respect to a lubricant such as engine oil. However, it is contemplated the working fluid may alternatively be another (e.g., liquid) fluid for the gas turbine engine such as coolant or fuel.

The fluid system 20 includes a lubricant reservoir 24 (e.g., a fluid tank, a bladder, a pressure vessel, etc.), a lubricant regulator 26 (e.g., a pump and/or a control valve) and the engine component 22. The lubricant regulator 26 is configured to control the flow of the lubricant between the lubricant reservoir 24 and the engine component 22. The lubricant regulator 26 of FIG. 1, for example, is fluidly coupled inline between the lubricant reservoir 24 and the engine component 22, and the engine component 22 is fluidly coupled inline between the lubricant regulator 26 and the lubricant reservoir 24. The lubricant regulator 26 may thereby direct (e.g., pump) the lubricant out of an internal volume 28 (e.g., a chamber, a cavity, a passage, etc.) of the lubricant reservoir 24 through a source circuit 30 to the engine component 22. The lubricant may then be collected from the engine component 22 (e.g., via a gutter, a sump, etc.) and returned to the lubricant reservoir 24 through a return circuit 32. The fluid system 20 of the present disclosure, however, is not limited to the foregoing exemplary fluid system configuration. The fluid system 20, for example, may alternatively be configured as a one way circuit where the source circuit 30 or the return circuit 32 may be omitted or combined into a two-way passage. The fluid system 20 may also or alternatively include one or more additional elements (e.g., engine component(s), fluid regulator(s), fluid reservoirs(s), filter(s), sensor(s), etc.) as well as one or more additional (e.g., parallel and/or serial) flow circuits.

During fluid system operation, pressure within the lubricant reservoir 24 and its internal volume 28 may rise. For example, gas such as air entrained within the lubricant returned to the lubricant reservoir 24 may collect within the lubricant reservoir 24 and its internal volume 28, which air may be separated from the lubricant by a deaerator 34 and/or otherwise. To prevent over pressurization of the lubricant reservoir 24, the lubricant reservoir 24 of FIG. 1 is configured with an electronically controlled pressure relief system 36. This pressure relief system 36 is configured to selectively open a pressure relief valve 38 to facilitate venting off the air within the internal volume 28, or a gaseous mixture of the air and the lubricant within the internal volume 28 where, for example, a mist and/or droplets of the lubricant are entrained within/carried by the air. This air or gaseous air-lubricant mixture (the vented fluid) may be vented to an environment 40 external to the gas turbine engine and the aircraft (e.g., ambient, outside environment) through a fluid system vent 39 coupled to the lubricant reservoir 24 by the pressure relief valve 38.

Figure 2:
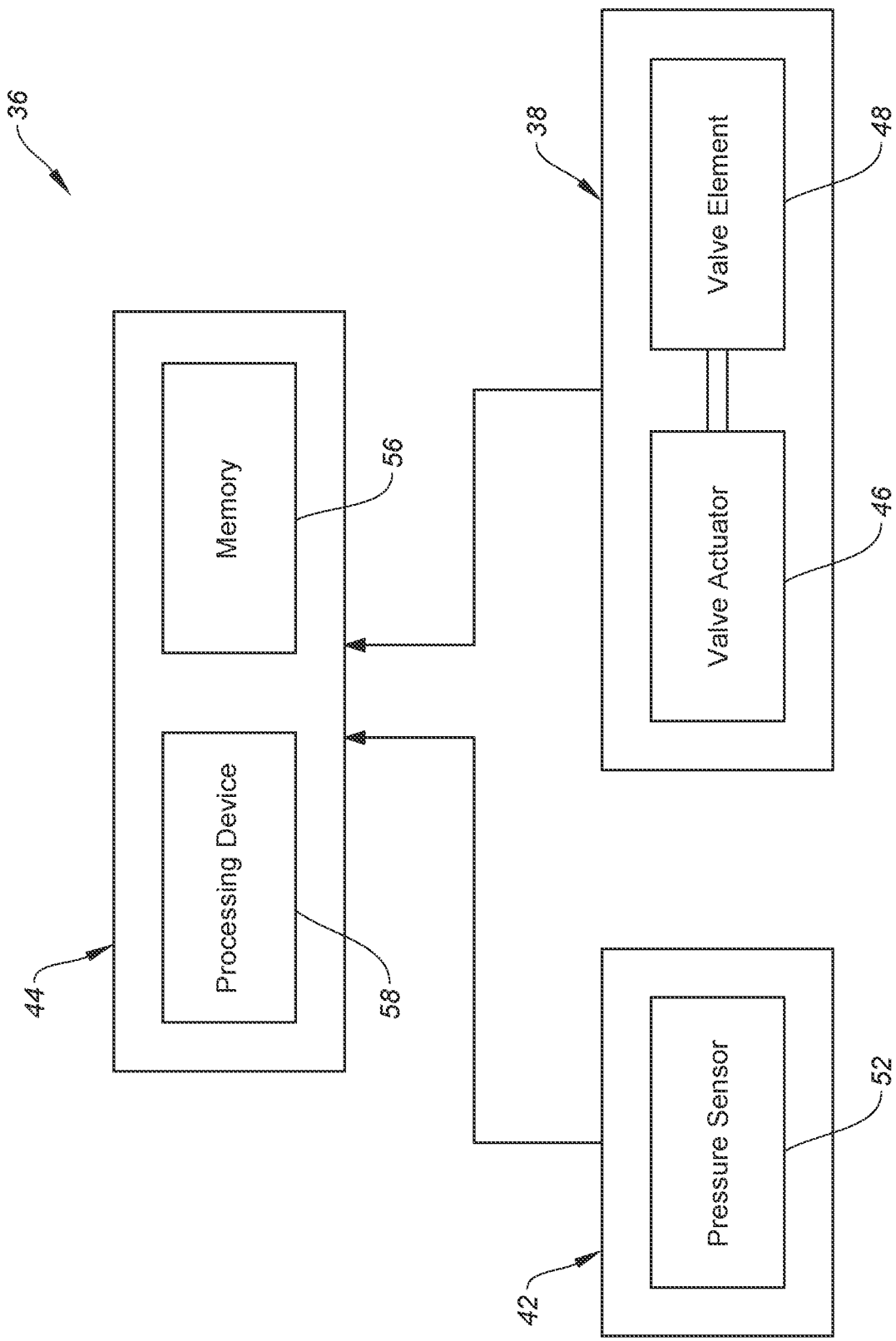
FIG. 2 is a schematic illustration of a pressure relief system for the fluid system.
Figure 3A:
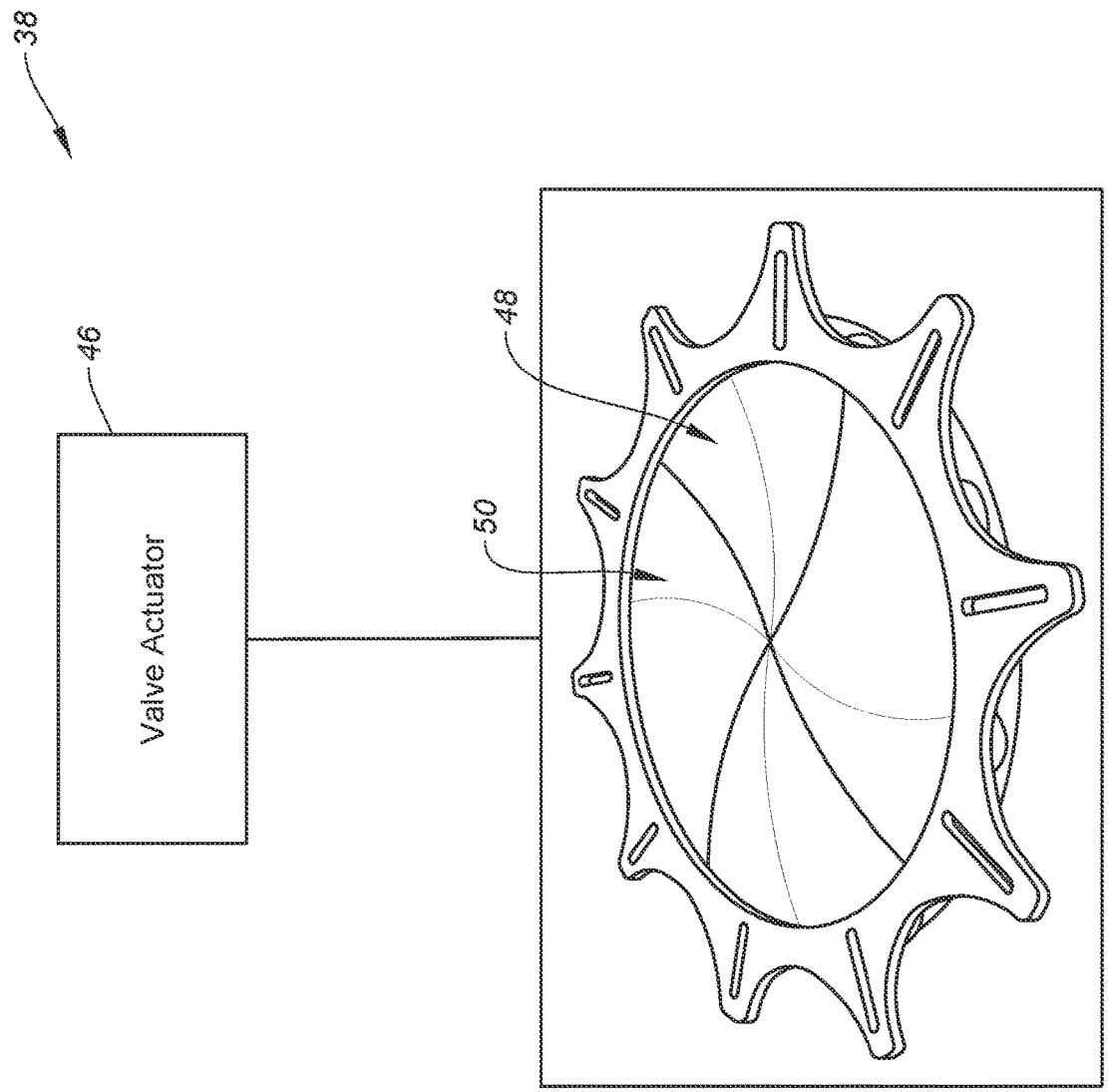
Figure 3C:
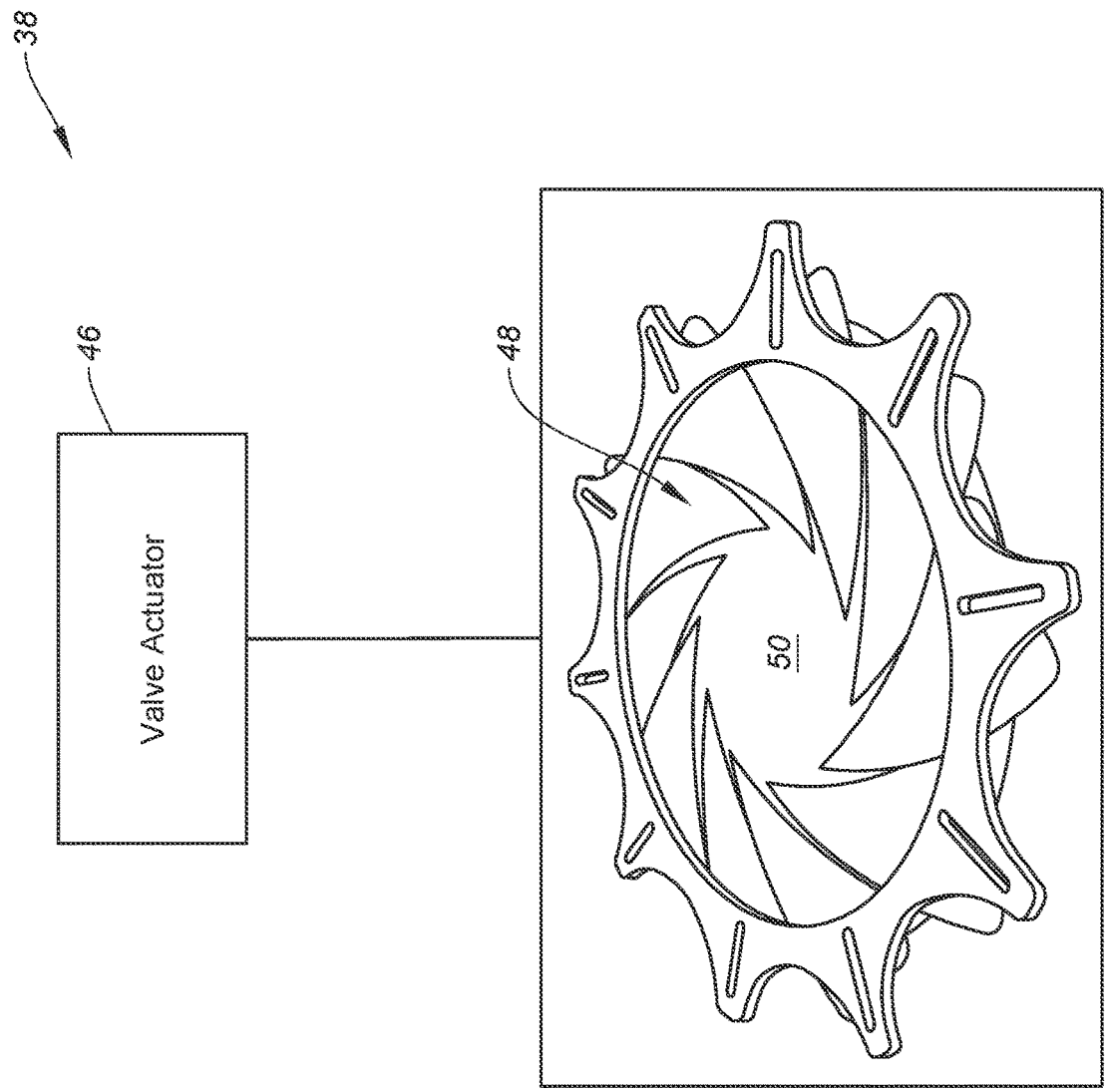
Figure 4C:
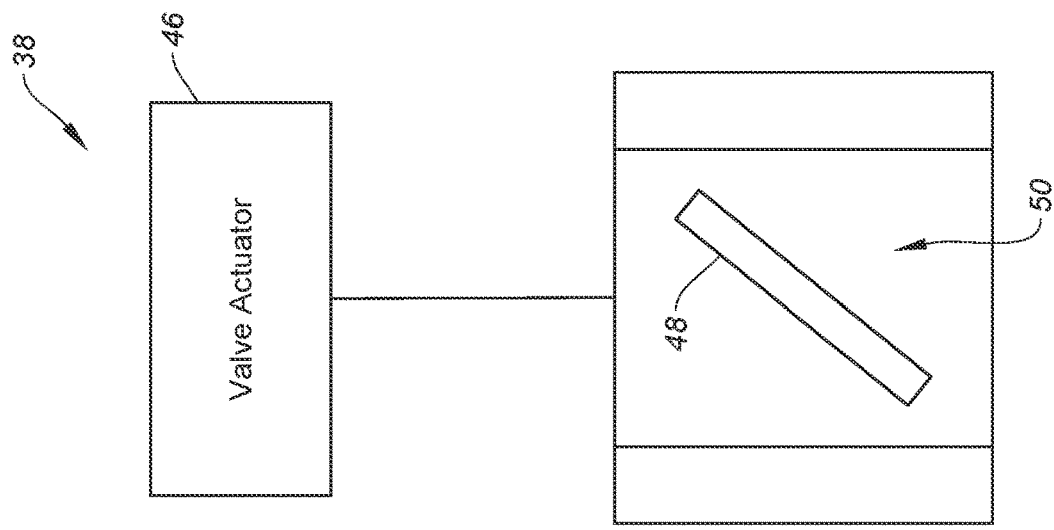
FIGS. 4A-C are schematic illustrations of another pressure relief valve in various positions.
Figure 4B:
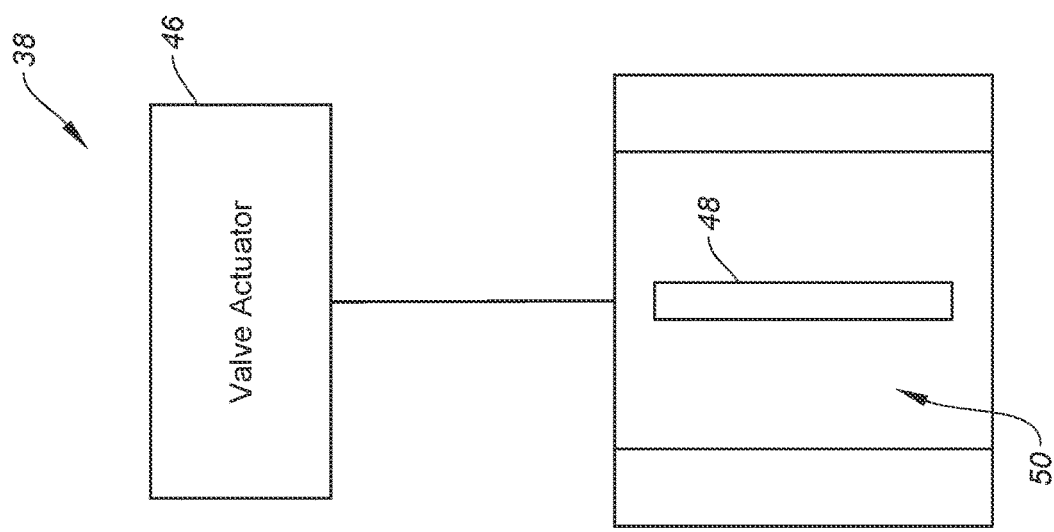
Figure 4A:
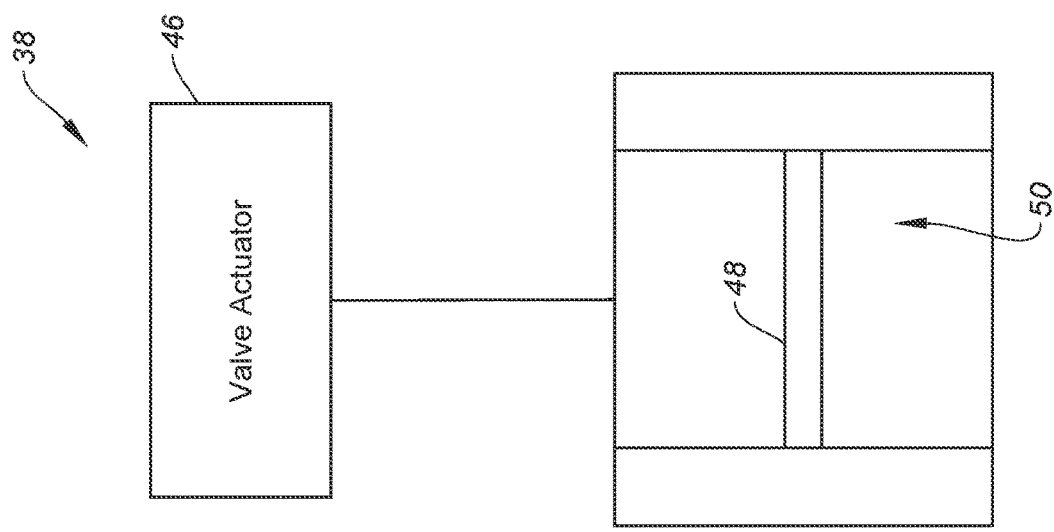
Figure 5C:
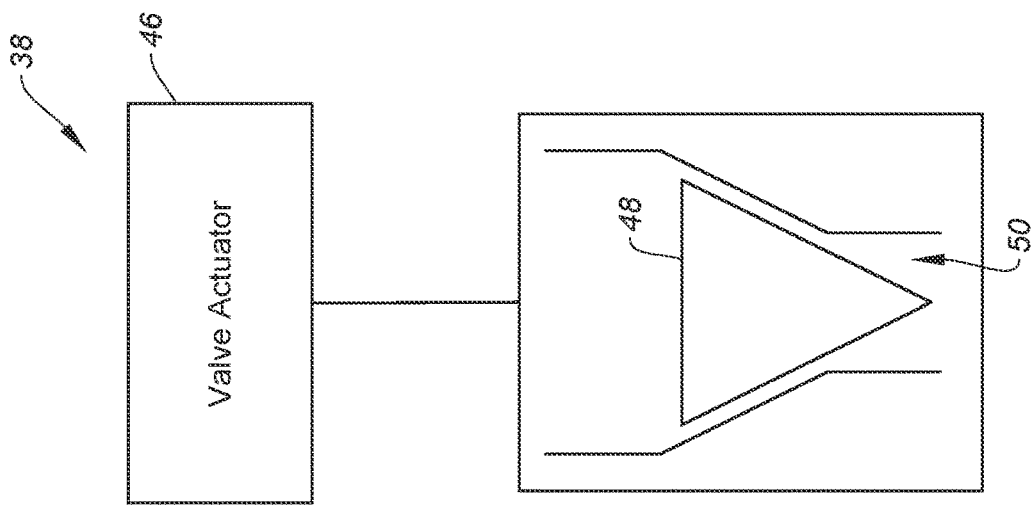
FIGS. 5A-C are schematic illustrations of still another pressure relief valve in various positions.
Figure 5B:
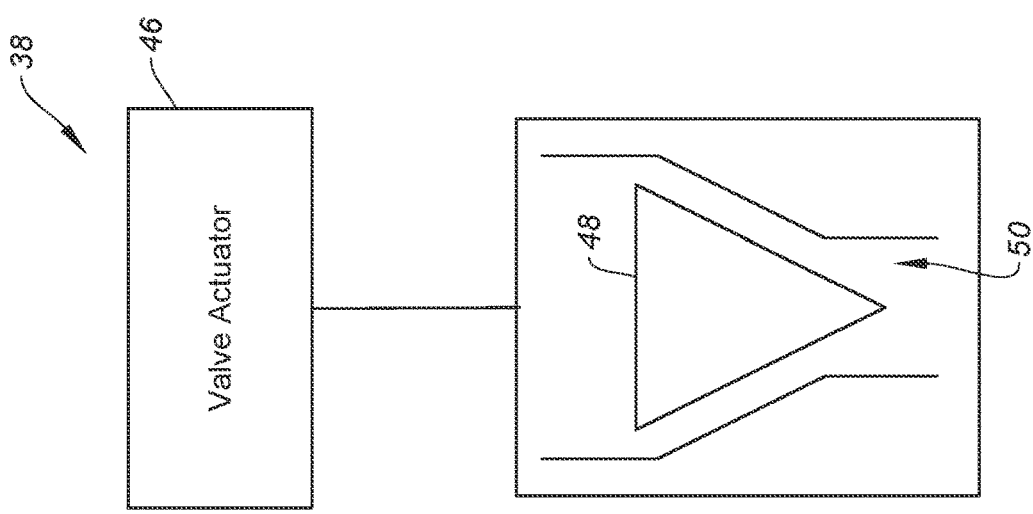

Referring to FIG. 2, the pressure relief system 36 includes the pressure relief valve 38, a sensor system 42 and an electronic controller 44 (e.g., a FADEC or the like). The pressure relief valve 38 may be configured as a variable area valve. The pressure relief valve 38 of FIG. 2, for example, includes a valve actuator 46 (e.g., an electric motor such as a stepper motor) and a valve element 48 coupled to the valve actuator 46. The valve actuator 46 is configured to move the valve element 48 to various positions. For example, referring to FIGS. 3A, 4A and 5A, the valve actuator 46 may move the valve element 48 to a fully closed position where the valve element 48 may completely cut-off/block fluid flow through the pressure relief valve 38. Here, a variable area opening 50 through the pressure relief valve 38 may be completely closed/shut and a flow area of the variable area opening 50 has a minimum (e.g., zero) value. Referring to FIGS. 3B, 4B and 5B, the valve actuator 46 may move the valve element 48 to a fully open position where the valve element 48 facilitates full fluid flow through the pressure relief valve 38. Here, the variable area opening 50 through the pressure relief valve 38 may be completely open and the flow area of the variable area opening 50 has a non-zero maximum value. Referring to FIGS. 3C, 4C and 5C, the valve actuator 46 may also move the valve element 48 to one or more intermediate/partially open positions where the valve element 48 facilitates partial fluid flow through the pressure relief valve 38. Here, the variable area opening 50 through the pressure relief valve 38 is partially open and the flow area of the variable area opening 50 has a respective non-zero intermediate value, where the intermediate value is less than the maximum value and greater than the minimum value. The one or more intermediate positions may be predetermined positions, or the valve element 48 may be infinitely adjustable between its (e.g., fully) closed and open positions. With the foregoing arrangement, the pressure relief valve 38 may variably meter fluid flow through the pressure relief valve 38.

Figure 5A:
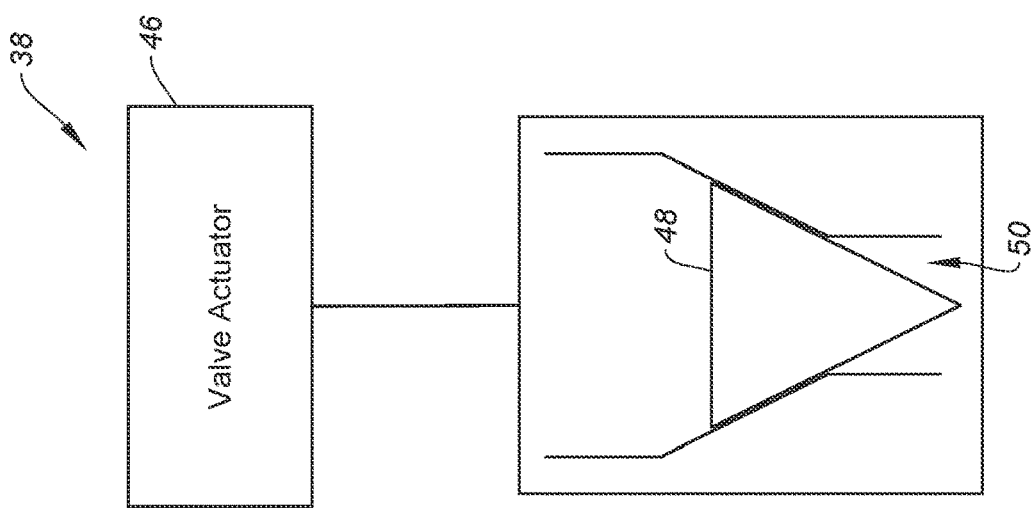

Referring to FIGS. 3A-C, the pressure relief valve 38 may be configured as an iris valve (also sometimes referred to as an iris diaphragm valve), and the valve element 48 may be configured as a valve iris. Referring to FIGS. 4A-C, the pressure relief valve 38 may alternatively be configured as a butterfly valve, and the valve element 48 may be configured as a valve disk (also sometimes referred to as a butterfly disk). Referring to FIGS. 5A-C, the pressure relief valve 38 may still alternatively be configured as a needle valve, and the valve element 48 may be configured as a valve needle (also sometimes referred to as a tapered valve plunger). The present disclosure, however, is not limited to such exemplary pressure relief valve configurations. For example, the pressure relief valve 38 may alternatively be configured as a poppet valve, a gate valve, a ball valve, a globe valve, etc.

The sensor system 42 of FIG. 1 is configured to determine a fluid pressure within the lubricant reservoir 24. The sensor system 42 of FIG. 1, for example, includes a pressure sensor 52 mounted to a wall 54 of the lubricant reservoir 24. This pressure sensor 52 is configured to measure the fluid pressure within the internal volume 28 at a sensor location. This sensor location may be disposed at or near the pressure relief valve 38 and/or otherwise above a volume of the liquid lubricant contained within the internal volume 28. The pressure sensor 52 of FIG. 1, for example, is configured to measure a gas pressure of the air or gaseous air-lubricant mixture within the internal volume 28 above the lubricant contained within the lubricant reservoir 24. The sensor system 42 is also configured to provide (e.g., output) sensor data indicative of the fluid pressure (e.g., gas pressure) measured by the pressure sensor 52 within the internal volume 28.

Referring to FIG. 2, the controller 44 is in signal communication with the sensor system 42 and the pressure relief valve 38. The controller 44 of FIG. 2, for example, is hardwired and/or wirelessly coupled with the pressure sensor 52 and the valve actuator 46. The controller 44 may be implemented with a combination of hardware and software. The hardware may include memory 56 and at least one processing device 58, which processing device 58 may include one or more single-core and/or multi-core processors. The hardware may also or alternatively include analog and/or digital circuitry other than that described above.

The memory 56 is configured to store software (e.g., program instructions) for execution by the processing device 58, which software execution may control and/or facilitate performance of one or more operations such as those described below. The memory 56 may be a non-transitory computer readable medium. For example, the memory 56 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 6:
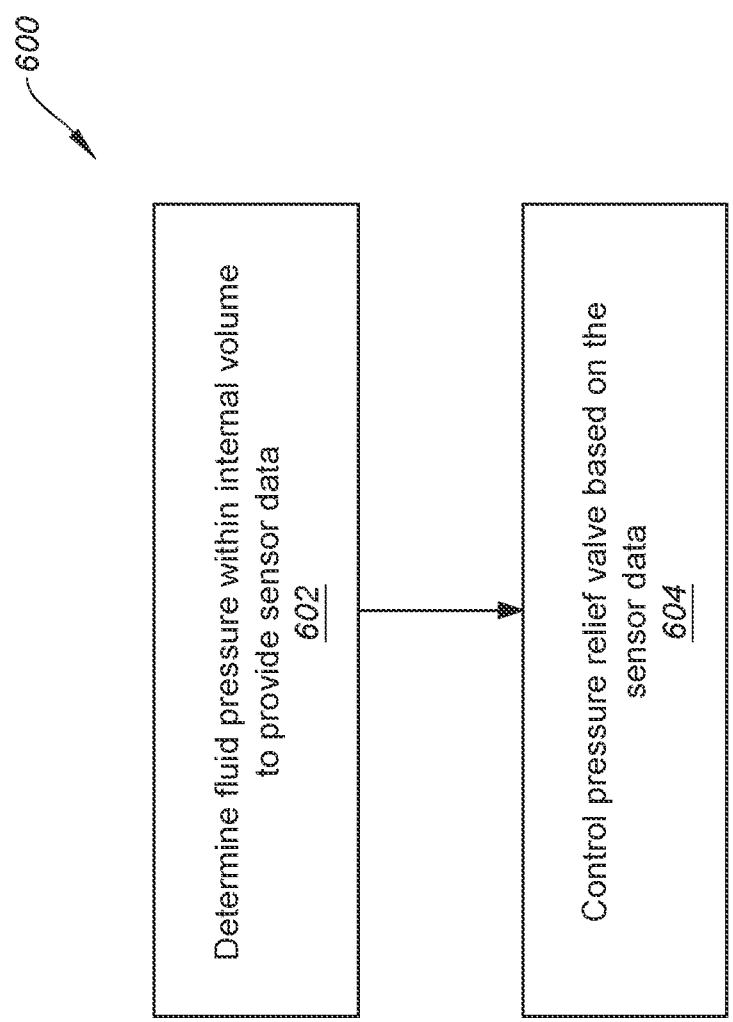
FIG. 6 is a flow diagram of a method for operating the fluid system.

FIG. 6 is a flow diagram of a method 600 for operating a fluid system. For ease of description, the operating method 600 is described with respect to the fluid system 20 and its pressure relief system 36 described above. The operating method 600 of the present disclosure, however, is not limited to such an exemplary fluid system.

In step 602, the fluid pressure within the internal volume 28 is determined. The pressure sensor 52 of FIG. 1, for example, may measure the fluid pressure (e.g., the gas pressure) within the internal volume 28. The sensor system 42 may then provide the sensor data to the controller 44 indicative of the measured fluid pressure.

In step 604, operation of the pressure relief valve 38 is controlled based on the sensor data. More particularly, the controller 44 may process the sensor data to determine if the pressure relief valve 38 should be closed or open, and if open how much. The measured fluid pressure, for example, may be compared to a threshold fluid pressure. Where the measured fluid pressure is less than the threshold fluid pressure, the controller 44 may signal the pressure relief valve 38 to close (or remain closed). However, where the measured fluid pressure is equal to or greater than the threshold fluid pressure, the controller 44 may signal the pressure relief valve 38 to open (or remain open). Moreover, an amount that the pressure relief valve 38 opens may correspond to how much the measured fluid pressure is over the threshold fluid pressure/a particular value of the measured fluid pressure. For example, where the measured fluid pressure is equal to or slightly over the threshold fluid pressure, the controller 44 may signal the pressure relief valve 38 to partially open; e.g., see FIG. 3C, 4C or 5C. Where the measured fluid pressure is significantly higher than the threshold fluid pressure (or greater than another threshold), the controller 44 may signal the pressure relief valve 38 to fully open; e.g., see FIG. 3B, 4B or 5B. The controller 44 may thereby signal the pressure relief valve 38 to change the flow area through its variable area opening 50 to different values based on the sensor data.

The amount the pressure relief valve 38 is opened may be based on a mathematical function and/or model, where the measured fluid pressure is input into the function and/or model to provide (e.g., generate) the control signal. The amount the pressure relief valve 38 is opened may also or alternatively be based on meeting one or more additional thresholds above the initial valve opening threshold. Such functions, models and/or thresholds may also account for various other system parameters such as, but not limited to: one or more operational parameters of the gas turbine engine; an altitude of the gas turbine engine/the aircraft; and/or an ambient parameter (e.g., temperature, pressure, etc.) outside of the gas turbine engine/the aircraft. For example, the threshold(s) may be obtained from a lookup table, where the lookup table is selected from various different lookup tables based on one or more of the system parameters. In another example, the functions and/or models may include one or more correction factors based on one or more of the system parameters. In this manner, the opening/closing of the pressure relief valve 38 may account for different conditions, operating modes, flight conditions, etc. encountered by the aircraft and its gas turbine engine during a flight. Thus, rather than tuning the opening/closing of the pressure relief valve 38 for optimal operation during a certain flight mode (e.g., takeoff, climb, cruise, descent, landing, taxiing, etc.) and/or for certain conditions (e.g., high altitude, low altitude, high ambient temperature, low ambient temperature, etc.), the controller 44 may optimize pressure relief valve operation for various different conditions, operating modes, flight conditions, etc.

For ease of description, the pressure relief valve 38 is generally described as being configured with the lubricant reservoir 24 where that lubricant reservoir is a standalone component. It is contemplated, however, the lubricant reservoir 24 may alternatively be paired with one or more other engine components. The lubricant reservoir 24, for example, may be an internal volume within a deoiler mounted to a gearbox; e.g., an epicyclic geartrain or an accessory gearbox. With such an arrangement, the pressure relieve valve 38 may be arranged at an outlet from the deoiler. The present disclosure therefore is not limited to the foregoing exemplary pressure relieve valve applications.

Figure 7:
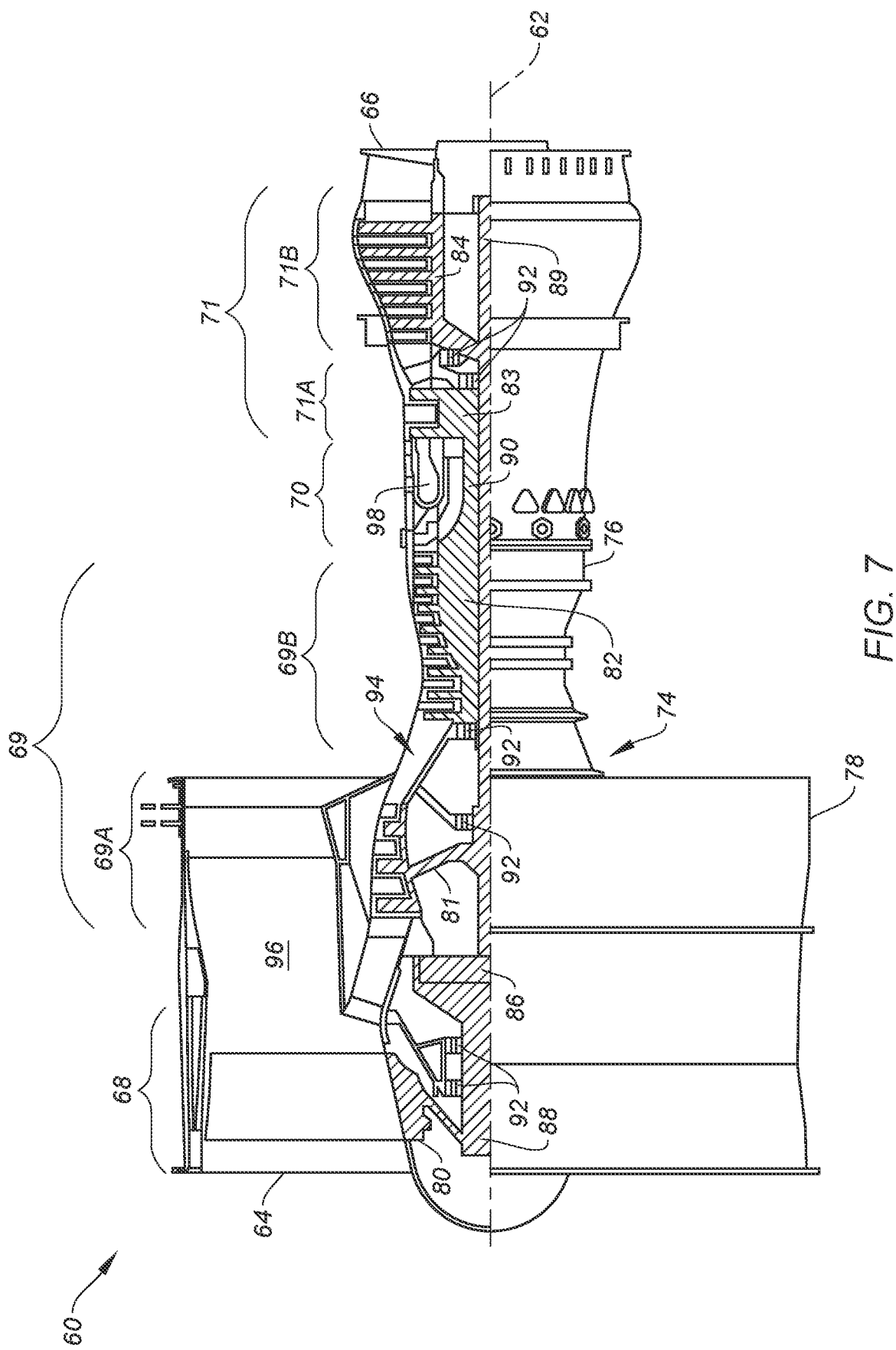
FIG. 7 is a side cutaway illustration of a gas turbine engine.

FIG. 7 is a side cutaway illustration of a gas turbine engine 60 which may include the fluid system 20 of FIG. 1. This turbine engine 60 extends along an axial centerline 62 between an upstream airflow inlet 64 and a downstream airflow exhaust 66. The turbine engine 60 includes a fan section 68, a compressor section 69, a combustor section 70 and a turbine section 71. The compressor section 69 includes a low pressure compressor (LPC) section 69A and a high pressure compressor (HPC) section 69B. The turbine section 71 includes a high pressure turbine (HPT) section 71A and a low pressure turbine (LPT) section 71B.

The engine sections 68-71B are arranged sequentially along the axial centerline 62 within an engine housing 74. This engine housing 74 includes an inner case 76 (e.g., a core case) and an outer case 78 (e.g., a fan case). The inner case 76 may house one or more of the engine sections 69A-71B; e.g., a core of the turbine engine 60. The outer case 78 may house at least the fan section 68.

Each of the engine sections 68, 69A, 69B, 71A and 71B includes a respective rotor 80-84. Each of these rotors 80-84 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 80 is connected to a geartrain 86, for example, through a fan shaft 88. The geartrain 86 and the LPC rotor 81 are connected to and driven by the LPT rotor 84 through a low speed shaft 89. The HPC rotor 82 is connected to and driven by the HPT rotor 83 through a high speed shaft 90. The engine shafts 88-90 are rotatably supported by a plurality of bearings 92; e.g., rolling element and/or thrust bearings. Each of these bearings 92 is connected to the engine housing 74 by at least one stationary structure such as, for example, an annular support strut. Here, the engine component 22 of FIG. 1 may be configured as the geartrain 86, one of the bearings 92 or another component in the turbine engine 60.

During operation, air enters the turbine engine 60 through the airflow inlet 64. This air is directed through the fan section 68 and into a core flowpath 94 and a bypass flowpath 96. The core flowpath 94 extends sequentially through the engine sections 69A-71B; e.g., the engine core. The air within the core flowpath 94 may be referred to as "core air". The bypass flowpath 96 extends through a bypass duct, which bypasses the engine core. The air within the bypass flowpath 96 may be referred to as "bypass air".

The core air is compressed by the LPC rotor 81 and the HPC rotor 82 and directed into a (e.g., annular) combustion chamber 98 of a combustor in the combustor section 70. Fuel is injected into the combustion chamber 98 and mixed with the compressed core air to provide a fuel-air mixture. This fuel-air mixture is ignited and combustion products thereof flow through and sequentially cause the HPT rotor 83 and the LPT rotor 84 to rotate. The rotation of the HPT rotor 83 and the LPT rotor 84 respectively drive rotation of the HPC rotor 82 and the LPC rotor 81 and, thus, compression of the air received from a core airflow inlet. The rotation of the LPT rotor 84 also drives rotation of the fan rotor 80, which fan rotor 80 propels the bypass air through and out of the bypass flowpath 96. The propulsion of the bypass air may account for a majority of thrust generated by the turbine engine 60, e.g., more than seventy-five percent (75%) of engine thrust. The turbine engine of the present disclosure, however, is not limited to the foregoing exemplary thrust ratio.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A fluid system for an aircraft engine, comprising:
a lubricant reservoir comprising an internal volume; and
a pressure relief system including a sensor system, a pressure relief valve and a controller, the sensor system configured to provide sensor data indicative of an air pressure within the internal volume, the pressure relief valve fluidly coupled with the internal volume, and the controller configured to control operation of the pressure relief valve based on the sensor data,
wherein the pressure relief valve is a variable area valve with a variable area opening, and
wherein the pressure relief valve comprises a valve actuator and a valve element, and the valve actuator is configured to move the valve element to each of a fully closed position, a fully open position, and a partially open position.

2. The fluid system of claim 1, wherein the controller is configured to signal the pressure relief valve to vent a fluid comprising air out of the internal volume when the air pressure within the internal volume is greater than a threshold.

3. The fluid system of claim 1, wherein the controller is configured to signal the pressure relief valve to close when the air pressure within the internal volume is less than a threshold.

4. The fluid system of claim 1, wherein
the controller is configured to signal the pressure relief valve to change a flow area of the variable area opening from a first value to a second value based on the sensor data.

5. The fluid system of claim 1, wherein the controller is further configured to control the operation of the pressure relieve relief valve based on an operational parameter of the aircraft engine.

6. The fluid system of claim 1, wherein the controller is further configured to control the operation of the pressure relief valve based on an altitude of the aircraft engine.

7. The fluid system of claim 1, wherein the controller is further configured to control the operation of the pressure relief valve based on an ambient parameter outside of the aircraft engine.

8. The fluid system of claim 1, wherein the pressure relief valve comprises an iris valve.

9. The fluid system of claim 1, wherein the pressure relief valve comprises a butterfly valve.

10. The fluid system of claim 1, wherein the pressure relief valve comprises a needle valve.

11. The fluid system of claim 1, wherein the pressure relieve-relief valve is configured to vent a fluid comprising air out of the internal volume into an environment external to the aircraft engine.

12. The fluid system of claim 1, further comprising:
an engine component; and
a source circuit configured to direct a lubricant from the internal volume to the engine component.

13. The fluid system of claim 12, further comprising a return circuit configured to direct the lubricant from the engine component into the internal volume.

14. The fluid system of claim 13, further comprising a deaerator configured to separate air from the lubricant directed into the internal volume through the return circuit.

15. An apparatus for an aircraft, comprising:
a gas turbine engine comprising a reservoir and a pressure relief system, the reservoir comprising an internal volume, and the pressure relief system including a sensor system, a pressure relief valve and a controller;
the sensor system configured to provide sensor data indicative of a gas pressure within the internal volume;
the pressure relief valve fluidly coupled with the internal volume; and
the controller configured to control operation of the pressure relief valve based on the sensor data,
wherein the pressure relief valve is a variable area valve, and
wherein the pressure relief valve comprises a valve actuator and a valve element, and the valve actuator is configured to move the valve element to each of a fully closed position, a fully open position, and a partially open position.

16. The apparatus of claim 15, wherein the controller is configured to signal the pressure relief valve to vent a gas out of the internal volume when the gas pressure within the internal volume rises above a threshold.

17. The apparatus of claim 15, wherein the reservoir is configured to contain a liquid within the internal volume.

18. A fluid system for an aircraft engine, comprising:
a fluid reservoir comprising an internal volume; and
a pressure relief system including a sensor system, a pressure relief valve and a controller, the sensor system configured to determine a fluid pressure within the internal volume and provide sensor data indicative of the fluid pressure, the pressure relief valve comprising a variable area opening fluidly coupled with the internal volume, and the controller configured to signal the pressure relief valve to selectively change a flow area of the variable area opening based on the sensor data to change how much gas is vented out of the internal volume through the variable area opening;
wherein the pressure relief valve comprises a valve actuator and a valve element, and the valve actuator is configured to move the valve element to each of a fully closed position, a fully open position, and a partially open position.

19. The fluid system of claim 18, wherein the fluid reservoir is configured to contain engine lubricant within the internal volume.

* * * * *